United States Patent

[11] 3,622,414

| [72] | Inventors | John F. Heimovics, Jr.<br>Stow;<br>James Sidles, West Richfield, both of Ohio |
|---|---|---|
| [21] | Appl. No. | 17,384 |
| [22] | Filed | Mar. 9, 1970 |
| [45] | Patented | Nov. 23, 1971 |
| [73] | Assignee | The B. F. Goodrich Company<br>New York, N.Y.<br>Original application Dec. 26, 1967, Ser. No. 693,510, now Patent No. 3,545,012.<br>Divided and this application Mar. 9, 1970, Ser. No. 17,384 |

[54] METHOD OF MAKING A PNEUMATIC TIRE
5 Claims, 5 Drawing Figs.

[52] U.S. Cl.................................................. 156/128 R, 264/326
[51] Int. Cl...................................................... B29h 17/20, B29h 17/28

[50] Field of Search........................................... 156/83, 110 R, 110 C, 123, 126, 127, 128, 129, 130, 131, 132, 133, 134, 287; 264/94, 315, 326; 152/352, 353, 361

[56] References Cited
UNITED STATES PATENTS
3,237,672  3/1966  McMannis.................... 264/326 X Primary Examiner—Benjamin A. Borchelt
Assistant Examiner—Stephen C. Bentley
Attorneys—W. A. Shira, Jr. and H. S. Meyer ABSTRACT: The method of making a pneumatic tire with reinforcing cords of stretchable material embedded therein, the cords having initially a low-tensile modulus and upon elongation a predetermined and limited amount abruptly changing to a substantially higher tensile modulus. The uncured carcass is fabricated in flat band form on a building drum with a drum set less than that required for a conventional tire of like final size. The uncured carcass is then removed from the drum, shaped to partial toroidal configuration and vulcanized. The tire expands to full toroidal configuration upon inflation.

PATENTED NOV 23 1971 3,622,414
SHEET 1 OF 2
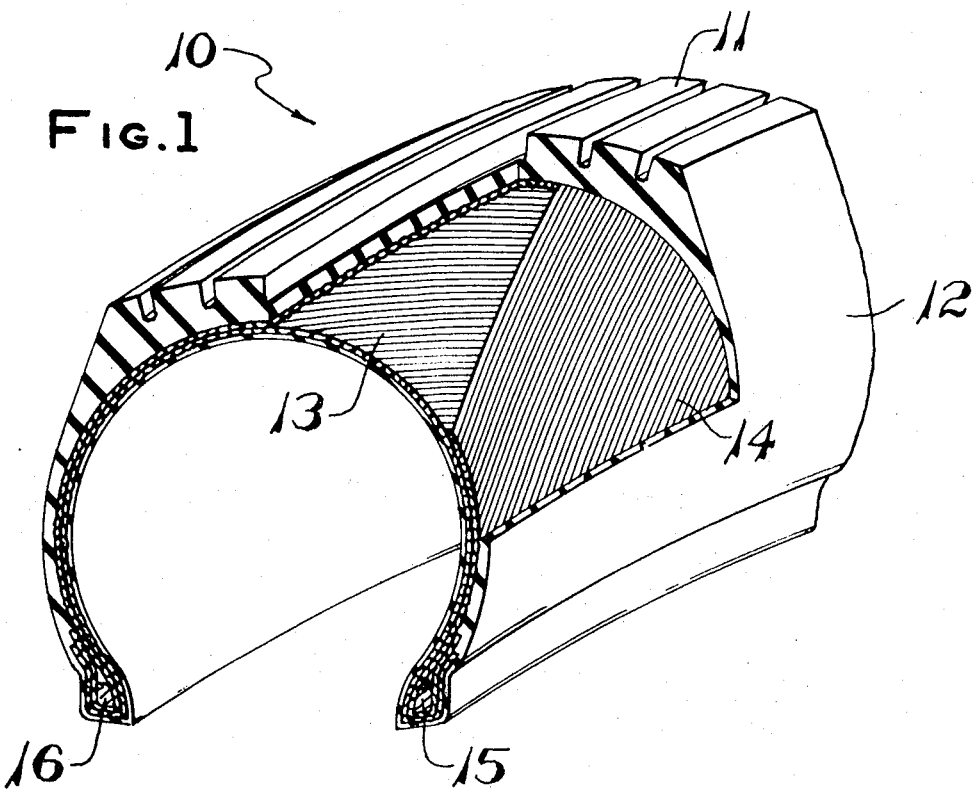
Fig. 1
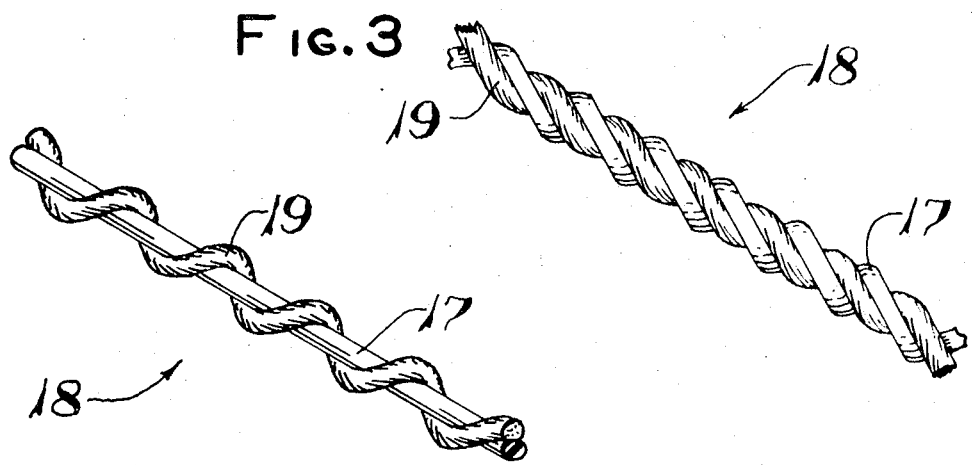
Fig. 3
Fig. 2
INVENTORS
JOHN F. HEIMOVICS, JR.
JAMES SIDLES
W. A. Shira, ATTY.

INVENTORS
JOHN F. HEIMOVICS, JR.
JAMES SIDLES 3,622,414

METHOD OF MAKING A PNEUMATIC TIRE

CROSS-REFERENCES TO RELATED APPLICATION

This application is a division of our copending application, Ser. No. 693,510, filed Dec. 26, 1967, now U.S. Pat. No. 3,540,512 issued Nov. 17, 1970.

BACKGROUND OF THE INVENTION

In the manufacture of pneumatic vehicle tires it is common practice to fabricate the uncured carcass of a collapsible building drum. The plies of cord reinforced elastomer are wrapped around the drum in superposed relationship such that the reinforcing cords in each ply interconnected spaced beads placed on the drum ends and make an acute angle with a plane perpendicular to the drum axis at the midpoint. The uncured elastomeric tread stock is then applied circumferentially on the carcass and the assembled, uncured tire is thereafter removed from the building drum, usually by use of an internal collapsing mechanism, then expanded to a generally toroidal configuration and vulcanized in a mold. Furthermore, by pantograph action the reinforcing cords shift in the uncured rubber in order to assume a position of least strain to permit proper shaping of the carcass when the tire is in the expanded configuration.

When a tire is overloaded by the vehicle, at any given inflation pressure, severe radial deflection occurs in the portion of the tread in contact with the ground. In view of the pantographic arrangement of the reinforcing cords, excessive radial deflection in the portion of the tire in contact with the ground causes the cords to be loaded compressively which in turn results in cord, and consequently, sidewall buckling. Buckling of the reinforcing cords causes more severe stress cycling in the cords and often premature failure of the tire.

SUMMARY OF THE INVENTION

The present invention solves the above-described problem of buckling of the reinforcing cords, when the tire is severely deflected radially from overloading, by providing a method of tire construction employing tire reinforcing cords having initially a low modulus of elongation and, upon elongation of a predetermined limited amount, abruptly changing to a higher modulus of elongation. The stretchable reinforcing cords are characterized by at least one textile yarn wrapped helically around a prevulcanized elastomeric core in openly spaced coiled arrangement.

The method of tire construction includes building and vulcanizing the tire with the reinforcing cords elongated within the region of lower tensile modulus, the completed vulcanized tire being in a partially shaped condition and of lesser cross-sectional size than a conventional tire of like inflated size. Upon inflation, the tire expands to full toroidal configuration in which the stretchable cords are elongated past the point of transition to the region of higher tensile modulus and are rendered substantially inextensible. When the tire is overloaded for any given inflation pressure, thereby causing severe local radial deflection of the tread, the tension in the cords in adjacent portions of the sidewalls is reduced sufficiently to permit those cords to reenter the region of low modulus of elongation. As a result, the cords contract sufficiently to prevent buckling of the tire sidewalls. The present invention thus provides a method of making a tire having the characteristic of sustaining sever deflection without buckling.

BRIEF DESCRIPTION OF THE DRAWINGS

FIG. 1 is an isometric view of a portion of a completed vulcanized tire in inflated condition made by the improved method, the tread and sidewall being partially broken away to show the reinforcing cords.

FIG. 2 is an enlarged view of a portion of the preferred form of stretchable reinforcing cord shown in the unstretched state.

FIG. 3 is a view of the cord illustrated of FIG. 2 but with the cord shown elongated beyond the point of transition to the higher tensile modulus.

DETAILED DESCRIPTION

Figure 4:
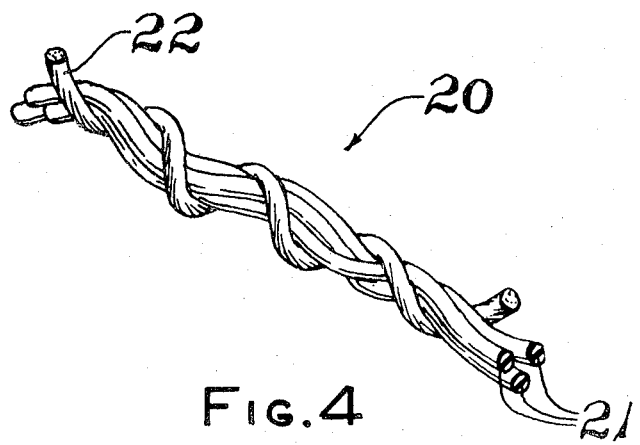
FIG. 4 is a perspective view similar to FIG. 2 illustrating a stretchable cord having a stranded core.

Referring now to FIG. 1, the completed, vulcanized and inflated tire 10 is shown in the presently preferred form with the tread 11 and sidewall 12 broken away to expose the reinforcing cord plies. Preferably, the tire carcass is fabricated with at least two layers, 13 and 14 of reinforcing cords which extend continuously in oblique arrangement from one bead core 15 to the opposite bead core 16, with adjacent superposed layers having the cords intersecting the axial plane of symmetry of the tire at equal but opposite acute angles.

The incorporation of elastically distensible reinforcing cords which undergo a transition from a low-tensile modulus to a substantially higher tensile modulus becoming thereafter substantially inextensible, enables the tire of the present invention to be vulcanized partially lifted or shaped and then expanded to full toroidal shape upon being inflated and to be thereafter inextensible. The cord used in building the carcass may be stretched a predetermined amount in the range 30–70 percent of its initial length. In the preferred form of the invention, the reinforcing cord has a core of prevulcanized elastomer with textile yarn wrapped helically around the core.

A tire, built in accordance with the presently preferred method, is constructed in flat band form on a conventional tire building drum by applying thereover plies of elastomeric material having the stretchable reinforcing cords therein. For passenger car tires, the drum has a diameter generally that of the beads. If desired for tubeless inflation of the completed tire, an air-impervious liner ply may be applied initially to the building drum before applying the uncured carcass plies.

Figure 5:
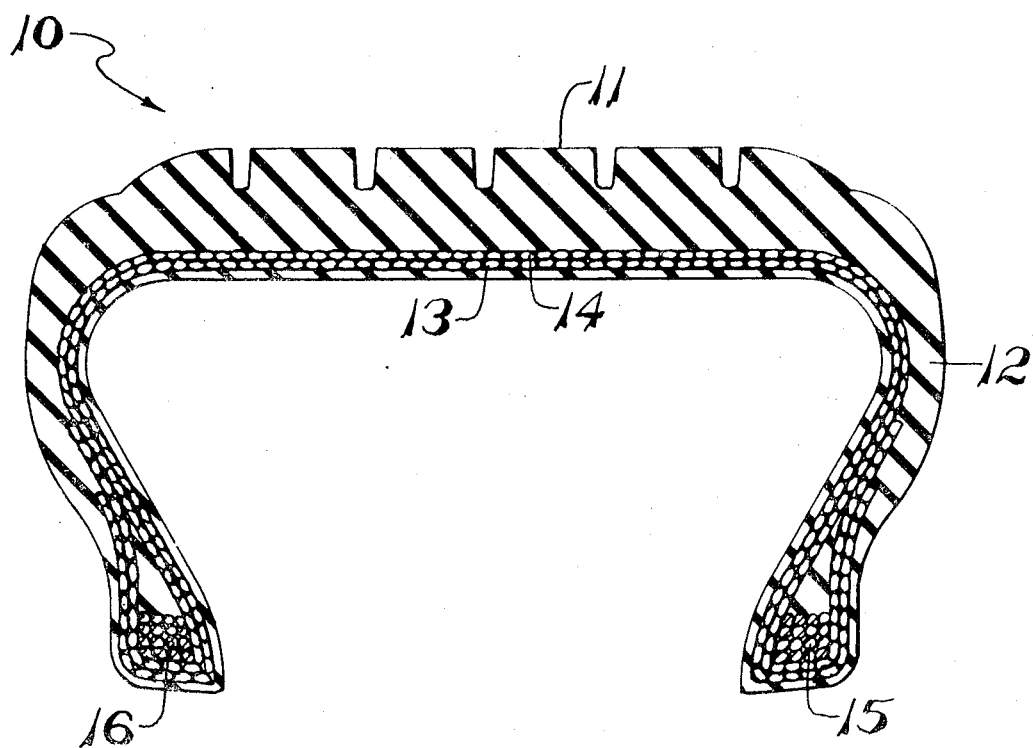
FIG. 5 is a cross-sectional view of the completed vulcanized tire in the deflated condition.

As previously mentioned, preferably the tire carcass is fabricated on a drum of a diameter substantially that of the tire beads and further with the drum set, or axial width, of the drum substantially less than the drum set required for the conventional method of making a tire of like size, that is, less than the axial arc length of the cords, in the inflated tire. The desired number of plies of elastomer having the stretchable reinforcing cord therein are applied to the building drum in annular superposed relationship with the cords disposed so as to make, in adjacent plies, equal but opposite oblique angles with the plane of tire rotation. The stretchable reinforcing cords, in the plies of elastomeric material, as applied to the building drum, are within the region of low modulus, or extensibility. A pair of bead reinforcements 15, 16 are then placed at the ends of the building drum in axially spaced parallel arrangement and the plies of cord reinforced elastomer turned thereover to form spaced beads. Uncured elastomeric material is then applied annularly over the carcass to form the tread and sidewalls thereby completing the carcass. The assembled uncured carcass is then removed from the building drum, shaped to a partially toroidal configuration and vulcanized in this state. FIG. 5 shows the tire as it appears in the vulcanized state prior to inflation. The tire, as shown in FIG. 5, is only partially expanded to the full toroidal configuration. In the preferred practice of the present invention, upon inflation the tread diameter of the vulcanized tire is expanded 25–30 percent from the vulcanized to the inflated diameter; however, the amount of expansion of the vulcanized tire is not limited to that of the preferred form for a given tire and the tire may be shaped and vulcanized to a diameter in the range 15 percent to 40 percent less than the fully inflated diameter.

Referring to FIG. 2, the reinforcing cord 18 is shown in an enlarged view of a portion of the cord. The cord is shown in FIG. 2 as it appears in the relaxed state, prior to expansion and vulcanization of the tire carcass. The carcass employs a cord 18 having a core 17 of preferably prevulcanized elastomeric material with at least one yarn 19 of substantially inextensible textile material wrapped helically around the core 17 in openly spaced coiled arrangement. The preferred embodiment of the tire employs cords as shown in FIG. 2 and 3 with the cord made as set forth in U.S. Pat. No. 3,455,100.

Referring now to FIG. 3, the cord 18 is shown as it appears when the tire in which it is incorporated is in the inflated state with the cord having passed the point of transition to the higher tensile modulus region. In the elongated, or inextensible state, the cord, as shown in FIG. 3, has the helically wound textile yarn 19 disposed in substantially less of a helix and more nearly linear than in the unstretched state with the elastomeric core 17 squeezed out between the stretched coils of the yarn to a position radially outward of the diameter of the yarn and disposed spirally therearound. The elastomeric core 17 makes a negligible contribution to the overall modulus of elongation after the transition point has been reached.

Another embodiment of the cord 20 is shown in FIG. 4 having a multiple-stranded core. The core 21 is formed by a plurality, preferably three, of elastomeric filaments pretwisted together and the yarn 22 wrapped helically therearound in the opposite sense from the core 21.

The invention thus comprises a method of making a pneumatic tire having initially stretchable low-tensile modulus reinforcing cords, which upon elongation a predetermined and limited amount produced by inflation of the tire, pass through an abrupt transition to have a substantially higher modulus of elongation. Hence, upon encountering severe local radial deflection, the reinforcing cords in the tire in the vicinity of the deflection contract into the region of low-tensile modulus without causing buckling of the tire sidewalls.

Modifications and adaptations may be made within the purview of the invention by those having ordinary skill in the art and the invention is limited only by the spirit and scope of the appended claims.

We claim:

1. The method of making a pneumatic tire comprising:
   a. providing plies of uncured elastomeric material having a plurality of parallel reinforcing cords therein, which cords each are stretchable and have initially a low-tensile modulus and upon elongation a predetermined and limited amount abruptly change to a substantially higher tensile modulus;
   b. applying at least two of said plies in annular superposed layers on a cylindrical building drum with the reinforcing cords disposed in adjacent layers at equal but opposite acute angles with the axial midplane of the drum;
   c. applying axially spaced bead cores on said plies adjacent the edges thereof and axially spaced from each other a predetermined amount less than arc-length of the cords in the inflated tire and turning the ends of the plies thereover to form beads thereon;
   d. applying uncured elastomer over the outer of the superposed plies from the building drum and expanding the assembled portion thereof axially intermediate the beads to a diameter in the range of 15–40 percent less than the desired inflated diameter and vulcanizing the tire.

2. The method defined in claim 1 characterized in that the assembled portion of the carcass intermediate the beads is expanded and vulcanized at a diameter such that the tire expands 25–30 percent of the vulcanized diameter upon inflation.

3. The method as defined in claim 1, wherein at least one liner layer of substantially air-impervious elastomer is applied to the building drum prior to applying the plies of elastomer containing stretchable cords for permitting tubeless inflation of the completed tire.

4. The method as defined in claim 1 wherein the said predetermined and limited amount of elongation of said cords is in the range of 30 to 70 percent of the initial length thereof.

5. The method as defined in claim 1 wherein the said cords each comprise a core of vulcanized elastomer and a textile yarn wrapped helically around the core.

* * * * *